(12) United States Patent
Ko

(10) Patent No.: US 11,890,967 B2
(45) Date of Patent: Feb. 6, 2024

(54) BRAKING SYSTEM OF VEHICLE CAPABLE OF REGENERATIVE BRAKING AND HYDRAULIC BRAKING AND CONTROLLING METHOD THEREOF

(71) Applicant: HYUNDAI MOBIS Co., Ltd., Seoul (KR)

(72) Inventor: Ji Weon Ko, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 317 days.

(21) Appl. No.: 17/235,260

(22) Filed: Apr. 20, 2021

(65) Prior Publication Data

US 2022/0134888 A1 May 5, 2022

(30) Foreign Application Priority Data

Nov. 4, 2020 (KR) .................. 10-2020-0146290

(51) Int. Cl.
| | |
|---|---|
| *B60L 7/26* | (2006.01) |
| *B60T 7/06* | (2006.01) |
| *B60T 13/58* | (2006.01) |
| *B60T 13/74* | (2006.01) |

(Continued)

(52) U.S. Cl.
CPC .................. *B60L 7/26* (2013.01);
*B60T 7/06* (2013.01); *B60T 8/17* (2013.01);
*B60T 8/4081* (2013.01); *B60T 13/586*
(2013.01); *B60T 13/745* (2013.01); *B60T 2220/04* (2013.01); *B60T 2270/604* (2013.01);
*B60T 2270/82* (2013.01)

(58) Field of Classification Search
CPC . B60T 1/10; B60T 8/17; B60T 8/4081; B60T 8/4086; B60T 13/586; B60T 13/745; B60T 13/686; B60T 13/662; B60T 13/746; B60T 7/06; B60T 7/042; B60T 2220/04; B60T 2270/82; B60T 2270/604; B60T 2270/402; B60T 2270/404; B60L 7/26; B60L 7/2009; B60L 2240/423; F16D 63/00
USPC ...................................... 303/3, 152
See application file for complete search history.

(56) References Cited

U.S. PATENT DOCUMENTS

| | | | |
|---|---|---|---|
| 2013/0025273 A1* | 1/2013 | Nozawa ............. | B60T 13/662 60/545 |
| 2013/0192222 A1* | 8/2013 | Nomura ............. | B60T 8/4077 60/545 |
| 2013/0197771 A1* | 8/2013 | Takeda ............. | B60T 13/745 701/70 |

\* cited by examiner

*Primary Examiner* — Robert A. Siconolfi
*Assistant Examiner* — San M Aung
(74) *Attorney, Agent, or Firm* — H.C. Park & Associates, PLC

(57) ABSTRACT

A brake system and a method of controlling the brake system including a pedal master unit, an electric booster unit, a pedal-feel generating unit, and an electric control unit, wherein the pedal master unit includes a master cylinder and an operating rod, the electric booster unit includes a motor, a motor piston, and a gear device-screw shaft combination, the pedal-feel generating unit includes a reaction disk configured to form a pedal feel force ($F_{RD}$) and a pedal spring arranged to form a pedal feel force ($F_{spring}$), and the electric control unit is configured to variably control, in a regenerative braking mode and in a hydraulic braking mode, a ratio (Continued)

of increase to decrease of the pedal feel force ($F_{RD}$) and a ratio of increase to decrease of the pedal feel force ($F_{spring}$).

20 Claims, 10 Drawing Sheets

(51) Int. Cl.
*B60T 8/17* (2006.01)
*B60T 8/40* (2006.01)

BRAKING SYSTEM OF VEHICLE CAPABLE OF REGENERATIVE BRAKING AND HYDRAULIC BRAKING AND CONTROLLING METHOD THEREOF

CROSS-REFERENCE TO RELATED APPLICATIONS

This application claims priority from and the benefit of, Korean Patent Application No. 10-2020-0146290, filed on Nov. 4, 2020, which is hereby incorporated by reference for all purposes as if set forth herein.

BACKGROUND

Field

Exemplary embodiments relate to vehicle braking systems capable of regenerative and hydraulic braking and methods of controlling the braking system.

Discussion of the Background

Regenerative braking is a braking method that drives a motor of a vehicle as a generator by using the driving inertia of the vehicle and uses a resistance generated by driving the motor as a braking force. At the time of braking, a hybrid electric vehicle (HEV) can be supplied with a stable braking force through the coordinated operation of a regenerative braking unit and a hydraulic braking unit.

The vehicle further includes an electric booster unit for boosting the driver's pedal effort. The electric booster unit utilizes the rotational torque of an electric motor provided in the electric booster unit to boost the depressive force by an operating rod that exerts a force internally to a master cylinder. Additionally, the electric booster unit is arranged to be responsive to a particular pedal feel force that is established for providing the driver with a required pedal feel force to brake the vehicle. Specifically, the electric booster unit is configured to depress a reaction disk and thereby form an appropriate pedal feel force corresponding to the pedal stroke made by the driver.

A conventional vehicle that is equipped with a regenerative braking unit and a hydraulic braking unit during regenerative braking reduces hydraulic pressure by using an electronic stability control (ESC) unit by the amount of braking compensation in proportion to the regenerative braking. To this end, a conventional vehicle requires an ESC having the capability of providing coordinated control of regenerative braking and hydraulic braking. Specifically, the ESC requires an additional pressure-reducing device such as an accumulator to reduce the hydraulic pressure, which requires a higher capability of the ESC. This results in increased cost.

Further, during regenerative braking of a conventional vehicle, the boosting ratio of the electric booster is increased to compensate for the braking hydraulic pressure reduced by the ESC by the amount of braking compensation by the regenerative braking. On the other hand, the maximum boosting ratio of the electric booster is limited, which undesirably restricts the amount of braking compensation due to regenerative braking.

The above information disclosed in this Background section is only for enhancement of understanding of the background of the invention and, therefore, it may contain information that does not constitute prior art.

SUMMARY

Exemplary embodiments are capable of providing vehicle braking systems capable of regenerative and hydraulic braking and methods of controlling the braking system, wherein when regenerative braking is performed, the hydraulic pressure is adjusted by an electric booster to correspond to a braking compensation amount by the regenerative braking in order to obviate the need for a special-purpose ESC.

Additional features of the invention will be set forth in the description which follows, and in part will be apparent from the description, or may be learned by practice of the invention.

According to one embodiment, there is of the provided a brake system including a pedal master unit, an electric booster unit, a pedal-feel generating unit, and an electric control unit. The pedal master unit includes a master cylinder, and an operating rod configured to transmit, to the master cylinder, a pedal effort generated by a depression on a pedal. The electric booster unit includes a motor, a motor piston configured to depress the master cylinder, and a gear device-screw shaft combination configured to convert a rotational motion of the motor into a linear motion of the motor piston. The pedal-feel generating unit includes a reaction disk configured to form a pedal feel force ($F_{RD}$) when depressed by one or more of the operating rod and the motor piston, and a pedal spring having one end connected to the operating rod and another end supported by the electric booster unit and arranged to form a pedal feel force ($F_{spring}$) that is dependent on a variable distance between the operating rod and the electric booster unit. The electric control unit is configured to variably control, in a regenerative braking mode and in a hydraulic braking mode, a ratio of increase to decrease of the pedal feel force ($F_{RD}$) formed by the reaction disk for a pedal stroke to the pedal and a ratio of increase to a decrease of the pedal feel force ($F_{spring}$) formed by the pedal spring for a pedal stroke on the pedal.

According to another embodiment, there is provided a brake system including a pedal master unit, an electric booster unit, a pedal-feel generating unit, and an electric control unit. The pedal master unit includes a master cylinder, and an operating rod configured to transmit, to the master cylinder, a pedal effort generated by a depression on a pedal. The electric booster unit includes a motor, a motor piston configured to depress the master cylinder, and a gear device-screw shaft combination configured to convert a rotational motion of the motor into a linear motion of the motor piston. The pedal-feel generating unit includes a reaction disk configured to form a pedal feel force ($F_{RD}$) when depressed by one or more of the operating rod and the motor piston, and a pedal spring having one end connected to the operating rod and another end supported by the electric booster unit and arranged to form a pedal feel force ($F_{spring}$) that is dependent on a variable distance between the operating rod and the electric booster unit. The electric control unit is configured to calculate a total required braking force ($F_{total}$) and a required regenerative braking force ($F_{reg}$) of a vehicle and to variably control a displacement (d) of the motor piston for a stroke on the pedal in a regenerative braking mode and according to whether or not a hydraulic braking force ($F_{hyd}$) is generated by the master cylinder.

According to another embodiment, there is provided a method of controlling a brake system, including calculating, in response to a depression on a braking pedal of a vehicle, a total required braking force for braking the vehicle based on a stroke to the braking pedal, which is measured by a pedal travel sensor, and determining whether to drive a regenerative braking unit provided in the vehicle, and calculating, when the regenerative braking unit is driven, a regenerative braking force required for performing a regenerative braking of the vehicle based on the total required braking force, and determining whether the total required braking force is provided by the regenerative braking force alone when the regenerative braking unit is driven, and starting a first regenerative braking mode upon determining that the total required braking force is provided by the regenerative braking force alone, and when starting the first regenerative braking mode, controlling an electric booster unit to render an increase rate of a pedal feel force ($F_{RD}$) of a reaction disk to be a first rate and to render an increase rate of a pedal feel force ($F_{spring}$) of a pedal spring to be a second rate greater than the first rate.

According to another embodiment, there is provided a method of controlling a brake system, including calculating, in response to a depression on a braking pedal of a vehicle, a total required braking force ($F_{total}$) for braking the vehicle based on a stroke to the braking pedal, which is measured by a pedal travel sensor, and calculating, when a regenerative braking unit provided in the vehicle is driven, a regenerative braking force ($F_{reg}$) required for performing a regenerative braking of the vehicle based on the total required braking force ($F_{total}$), and calculating, based on the regenerative braking force ($F_{reg}$), a first displacement ($d_1$) of a motor piston configured to depress a reaction disk to provide a driver with a pedal feel force, and determining whether the total required braking force ($F_{total}$) is provided by the regenerative braking force ($F_{reg}$) alone when the regenerative braking unit is driven, and starting a first regenerative braking mode upon determining that the total required braking force ($F_{total}$) is provided by the regenerative braking force ($F_{reg}$) alone, and controlling an electric booster unit provided in the vehicle to cause the motor piston to have a displacement that equals to the first displacement ($d_1$).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
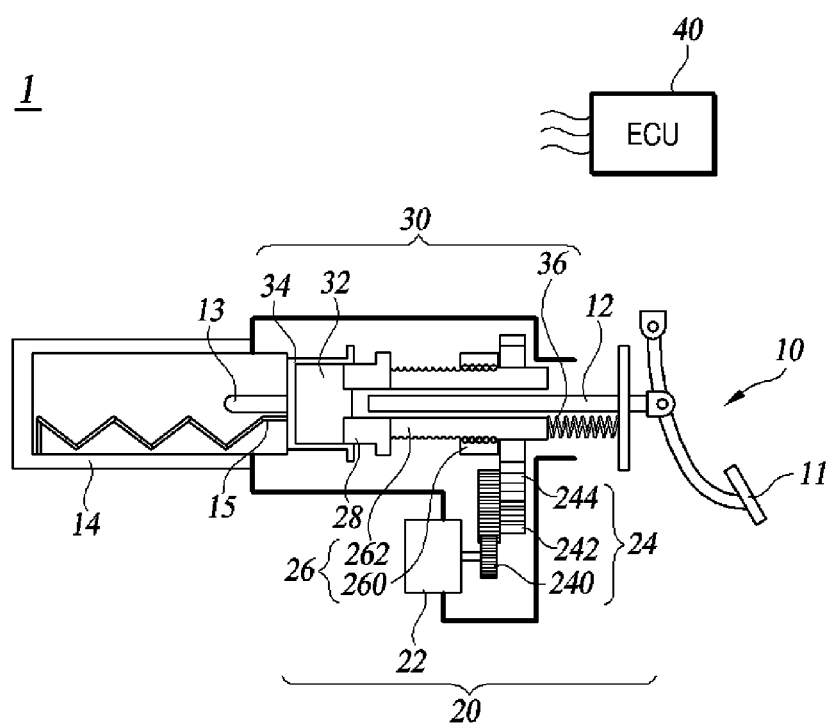
FIG. 1 is a conceptual diagram illustrating an initial operating state of a brake system according to at least one embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Accordingly, at least one embodiment seeks to provide a brake system and a control method thereof capable of arranging a general specification ESC by performing hydraulic control during regenerative braking with an electric booster unit, thereby reducing costs.

Further, one or more embodiments are operative to provide a brake system and a control method thereof capable of regenerative braking wherein hydraulic control is performed with an electric booster unit and not limited to the maximum boosting ratio of the electric booster unit.

The problems to be solved by the embodiments described herein are not limited to those mentioned above, and other unmentioned problems will be clearly understood by those skilled in the art from the following description.

Some exemplary embodiments are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Alphanumeric codes such as first, second, i), ii), a), b), etc., in describing components of embodiments are used solely for the purpose of differentiating one component from the other but not to imply or suggest the substances, the order, or sequence of the components throughout this specification, when a part "includes" or "comprises" a component, the part is meant to further include other components, not excluding thereof unless there is a particular description contrary thereto.

However, it should be noted that the conceptual diagrams of a brake system 1 shown in FIGS. 1, 2, 3A, 3B, 3C, 5A and 5B are simplified to make it easier to understand the operation process of the brake system 1, and the illustrated brake system 1 may differ from the specific profile of the actual system. For example, the brake system 1 has a housing enclosing at least some of an operating rod 12 and at least some of an electric booster unit 20, wherein the housing may be shaped differently from that shown in the drawings, and it may be appropriately shaped by a person skilled in the art to at least partially enclose the operating rod 12 and the electric booster unit 20.

Invalid Stroke State

FIG. 1 is a conceptual diagram illustrating an initial operating state of the brake system 1 according to at least one embodiment.

Figure 4:
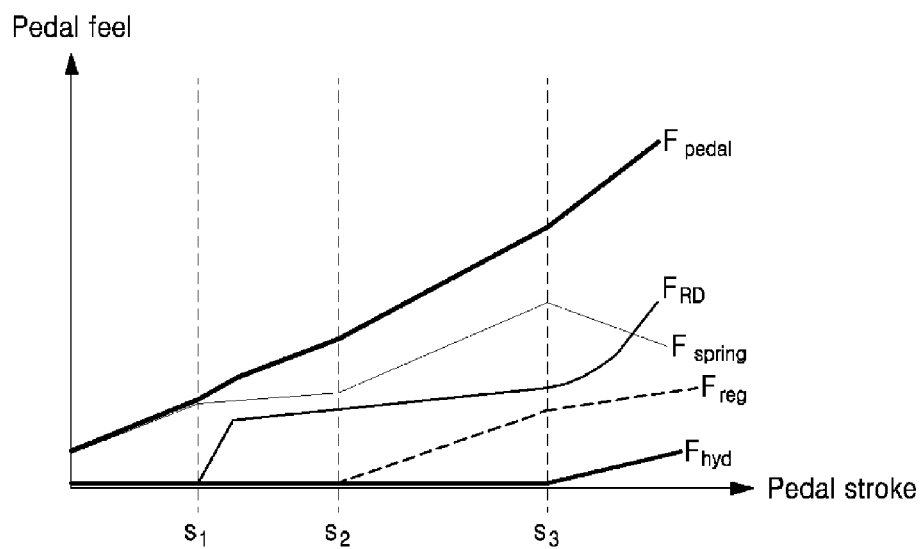
FIG. 4 is a graph showing a relationship between a pedal stroke and a pedal feel force for each of the sections in a regenerative braking mode of the brake system according to at least one embodiment.

As shown in FIG. 1, the brake system 1 according to at least one embodiment includes all or some of a pedal master unit 10, a brake pedal or simply a pedal 11, the electric booster unit 20, a pedal-feel generating unit 30, and an electric control unit 40. In particular, FIG. 1 shows a state in which the driver starts to depress the pedal 11, that is, an initial state in which a brake request signal begins to be generated by the electric control unit 40. For example, referring also to FIG. 4, FIG. 1 shows a pedal stroke s on the pedal 11 where stroke $s < s_1$.

The pedal master unit 10 includes all or some of the pedal 11, the operating rod 12, a main piston 13, a master cylinder 14, and a return spring 15. The pedal master unit 10 is configured to be responsive to a force applied on the pedal 11 by the driver for transmitting the same to the master cylinder 14.

The pedal 11 is a part that the driver depresses for deceleration or stopping of a vehicle that the brake system 1 works with. When the driver depresses the pedal 11 to press one end of the operating rod 12 by a predetermined pressure or more, the other end of the operating rod 12 depresses a reaction disk 32 included in the pedal-feel generating unit 30. At this time, the stroke of the pedal 11 is detected by a separate pedal travel sensor (not shown).

The operating rod 12 is a component that transmits the driver's pedal effort to the reaction disk 32. The operating rod 12 has one end connected to the pedal 11. The pedal effort transmitted to the reaction disk 32 is relayed to the master cylinder 14 through the operating rod 12. In the initial state in which the pedal 11 begins to be depressed, the other end of the operating rod 12 is spaced from the reaction disk 32. As the pedal 11 is depressed, the other end of the operating rod 12 advances toward the reaction disk 32.

The main piston 13 is at least partially inserted into the inside of the master cylinder 14. The main piston 13 reciprocates inside the master cylinder 14 in the longitudinal direction of the master cylinder 14, and advancement of the main piston 13 may depress a brake fluid stored inside the master cylinder 14.

The master cylinder 14 is configured to receive the brake fluid therein. The brake fluid inside the master cylinder 14 is pressurized to form a hydraulic pressure used for braking. The hydraulic pressure that is formed is transmitted to a plurality of wheel brake assemblies (not shown) of the vehicle.

Disposed inside of the master cylinder 14, the return spring 15 is compressed or expanded by the reciprocating motion of the main piston 13. The return spring 15 may preferably be a coil spring. However, this embodiment is not necessarily limited thereto, and the return spring 15 may be formed of an elastic body such as a leaf spring or rubber.

The return spring 15 is disposed inside the master cylinder 14 to be depressed by some of the force transmitted by the operating rod 12 and the electric booster unit 20.

The electric booster unit 20 is configured to boost the driver's pedal effort. The electric booster unit 20 includes all or some of a motor 22, a gear device 24, a screw shaft 26, and a motor piston 28.

The motor 22 is configured to rotate in the forward direction or the reverse direction according to the signal from the electric control unit 40.

The gear device 24 is configured to transmit the rotational torque of the motor 22 to the screw shaft 26. The gear device 24 includes all or some of a first gear 240, a second gear 242, and a third gear 244.

The first gear 240 primarily receives the rotational torque transmitted from the motor 22 and transmits the same to the second gear 242. The second gear 242 transmits the rotation torque received from the first gear 240 to the third gear 244. The third gear 244 transmits the rotation torque received from the second gear 242 to the screw shaft 26. Based on the ratio of the number of teeth of the first gear 240 to the third gear 244, the rotation speed may increase or decrease at a certain rate while it is transmitted to the first gear 240 to the third gear 244.

The screw shaft 26 is configured to convert the rotational torque transmitted by the gear device 24 into linear motion. The screw shaft 26 includes both or some of a first shaft 260 and a second shaft 262.

The first shaft 260 rotates while being constrained by the third gear 244. The second shaft 262 is configured to convert a rotational motion of the first shaft 260 into a linear motion. Preferably, the first shaft 260 may be configured as a pinion, and the second shaft 262 may be configured as a rack. One end of the second shaft 262 is connected to the motor piston 28. Accordingly, as the motor 22 is driven, the second shaft 262 makes a forward movement toward the reaction disk 32 or a backward movement in the reverse direction.

The motor piston 28 reciprocates in the longitudinal direction of the master cylinder 14 with the force transmitted by the gear device 24 and the screw shaft 26 combined. The motor piston 28 is arranged to have one side depressed by the second shaft 262 and the other side for depressing the reaction disk 32.

The motor piston 28 is disposed close to the first shaft 260 when the pedal 11 is not pressed, that is, no brake request signal is present. Hereinafter, the position of the motor piston 28 in the above-described state is referred to as a 'setting position'.

When there is a pressure on the pedal 11 by the driver, the pedal-feel generating unit 30 provides a pedal feel to the driver. The pedal-feel generating unit 30 is formed to be pressed by at least one of the operating rod 12 and the motor piston 28. The reaction force against the pedal feel formed by the pedal-feel generating unit 30 is transmitted to the main piston 13. The main piston 13 presses the inside of the master cylinder 14, thereby forming a hydraulic braking force $F_{hyd}$. The pedal-feel generating unit 30 includes all or some of the reaction disk 32, a reaction disk container 34, and a pedal spring 36.

The reaction disk 32 is arranged to be depressed by the operating rod 12. When one end of the operating rod 12 is depressed by the driver's depressing force on the pedal 11, the other end thereof depresses the reaction disk 32.

Additionally, the reaction disk 32 is arranged to be depressed by the motor piston 28. Meanwhile, referring to FIG. 1, although in an initial state, the reaction disk 32 is shown depressed by the motor piston 28. However, when no brake request signal is generated by the electric control unit 40, the motor piston 28 may remain spaced apart from the reaction disk 32, that is, in the setting position.

Figure 2:
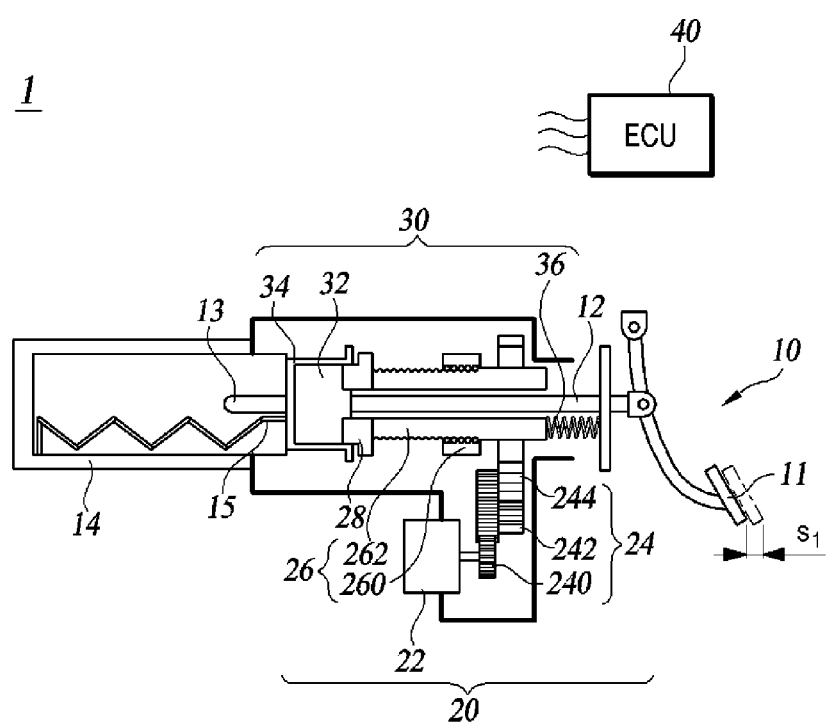
FIG. 2 is a conceptual diagram illustrating a state of a brake system according to at least one embodiment.

On the other hand, as the pedal 11 is depressed, the end of the operating rod 12 advances toward the reaction disk 32 and comes into contact thereof as shown in FIG. 2. When more pressurized than the depressed state of the pedal 11 shown in FIG. 2, the reaction disk 32 is pressed at its outer circumference by the motor piston 28 and pressed at its center by the operating rod 12. To this end, the motor piston 28 may be configured to have an approximately annular type of cross section and an open center for the operating rod 12 to pass through. At this time, the operating rod 12 and the reaction disk 32 are disposed coaxially. This embodiment is not necessarily limited to this particular configuration, and the outer circumference of the reaction disk 32 may be pressed by the operating rod 12, and the central portion of the reaction disk 32 may be pressed by the motor piston 28. Even in this case, the operating rod 12 and the reaction disk 32 are preferably arranged coaxially.

The reaction disk 32 is made of a compressible material. For example, at least a portion of the reaction disk 32 may be formed of a rubber material. When the reaction disk 32 is pressed by one or both of the operating rod 12 and the motor piston 28, the reaction force formed by the pressing force is transmitted to the driver through the operating rod 12, wherein the reaction force constitutes part of the pedal feel for the driver can detect. Hereinafter, the pedal feel is referred to as $F_{RD}$ that is formed as the reaction disk 32 is compressed by an external force.

The reaction disk container 34 is internally formed with space for accommodating at least a portion of the reaction disk 32. When one side of the reaction disk container 34 is pressed by at least one of the operating rod 12 and the motor piston 28, the other side of the reaction disk container 34 presses the main piston 13.

The pedal spring 36 is disposed between the operating rod 12 and the electric booster unit 20. Specifically, the pedal spring 36 has one end connected to one point of the operating rod 12 and the other end connected to a part of the electric booster unit 20. In the embodiment described herein, the other end of the pedal spring 36 is shown to be supported by the second shaft 262. For this reason, the pedal spring 36 is adapted to be compressed or tensioned depending on a variable distance between the one point of the operating rod 12 and the second shaft 262. At this time, a reaction force against the compression force of the pedal spring 36 forms a pedal feel force to the driver. Hereinafter, the pedal feel force is referred to as $F_{spring}$ that is formed as the pedal spring 36 is compressed by an external force.

The total pedal feel force ($F_{pedal}$) provided to the driver may be determined by the sum of the pedal feel force ($F_{RD}$) that is formed due to the reaction force against the compression force of the reaction disk 32 and the pedal feel force ($F_{spring}$) that is formed due to the reaction force against the compression force of the pedal spring 36.

The electric control unit 40 forms a brake request signal based on the pedal stroke (s) received from a pedal travel sensor (not shown). The braking request signal is an electrical signal that causes at least some of a plurality of wheel brake mechanisms (not shown) to form braking force.

The electric control unit 40 calculates the total required braking force (F total) for braking the vehicle based on pedal stroke s. Further, the electric control unit 40 determines whether or not to perform regenerative braking and controls the electric booster unit 20 differently depending on whether or not to perform the regenerative braking. The operation of the brake system 1 when the regenerative braking mode begins is started will be described with reference to FIGS. 3A to 4, and the operation of the brake system 1 when a hydraulic braking mode is started will be described with reference to FIGS. 5A to 6.

FIG. 2 is a conceptual diagram illustrating a state of a brake system according to at least one embodiment. In this case, referring also to FIG. 4, FIG. 2 shows a case where the pedal stroke s is $s_1$.

During the transition from FIG. 1 to FIG. 2, that is, when the pedal stroke, $s<s_1$ with s increasing, the end of the operating rod 12 is yet to contact the reaction disk 32 while it is still advancing. For this reason, pedal feel force $F_{RD}$ formed by the reaction disk 32 is not transmitted to the driver. At this time, the distance is reduced between the second shaft 262 and the one point of the operating rod 12, and the pedal spring 36 is compressed. Pedal feel force $F_{spring}$ formed by the reaction force against the compression force of the pedal spring 36 is transmitted to the driver, which becomes total pedal feel force $F_{pedal}$. This satisfies the relationship that $F_{pedal}=F_{spring}$.

On the other hand, as shown in FIG. 2, when stroke $s=s_1$, the pedal 11 that was depressed has advanced the operating rod 12 in the depression direction. At the same time, the second shaft 262 presses the motor piston 28 due to the driving of the electric booster unit 20. The motor piston 28 presses the outer circumference of the reaction disk 32, and the central portion of the elastic reaction disk 32 protrudes. At this time, the protruding central portion of the reaction disk 32 comes into contact with the end of the operating rod 12 in its advanced state. Accordingly, from the moment when $s=s_1$, pedal feel force $F_{RD}$ formed by the reaction disk 32 is transmitted to the driver. This satisfies the relationship that $F_{spring}=F_{RD}+F_{pedal}$.

Further from the depression as in FIG. 2, when the pedal stroke, $s_1<s<s_2$ with increasing, the motor piston 28 advances, which in turn increases the force applied to the reaction disk 32. As a resultant reaction force, pedal feel force $F_{RD}$ formed by the reaction disk 32 increases. Since the moving distance of the motor piston 28 is substantially equal to or slightly different from pedal stroke s, the compressed length of the pedal spring 36 remains unchanged or slightly increased or decreased. Therefore, the value of pedal feel force $F_{spring}$ remains the same or slightly decreases or increases.

On the other hand, when the pedal stroke, $s<s_2$, none of the regenerative braking force and hydraulic braking force are provided to the vehicle. In other words, in the state shown in FIGS. 1 and 2, the brake system 1 resides in a dead stroke section.

Regenerative Braking Mode

The regenerative braking mode of the brake system according to at least one embodiment includes a first regenerative braking mode and a second regenerative braking mode.

In the first regenerative braking mode, the brake system 1 performs braking when commenced by using only the regenerative braking provided in the vehicle. Here, the total required braking force $(F_{total})$ is satisfied by the regenerative braking force $(F_{reg})$ alone formed by the regenerative braking unit (not shown).

In the second regenerative braking mode, the brake system 1 performs braking when commenced by using both regenerative braking and hydraulic braking. Here, total required braking force $F_{total}$ is the sum of regenerative braking force $F_{reg}$ and hydraulic braking force $F_{hyd}$. In this embodiment, the operation of the brake system 1 in the first regenerative braking mode will be described with reference to FIGS. 3A and 3B, and the operation of the brake system 1 in the second regenerative braking mode will be described with reference to FIG. 3C.

Figure 3A:
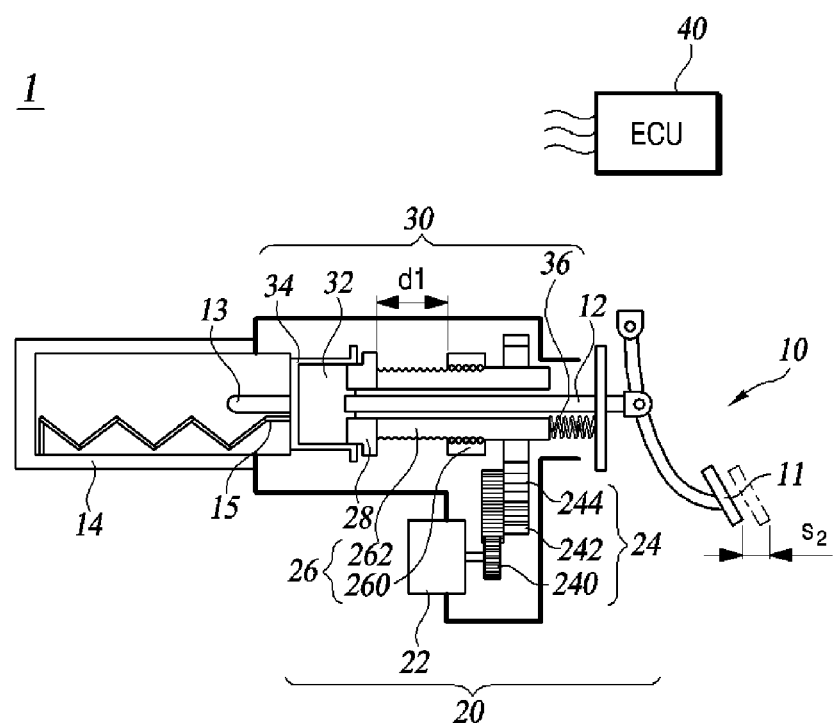
FIG. 3A is a conceptual diagram illustrating a state of the brake system in a first regenerative braking mode, according to at least one embodiment.
Figure 3B:
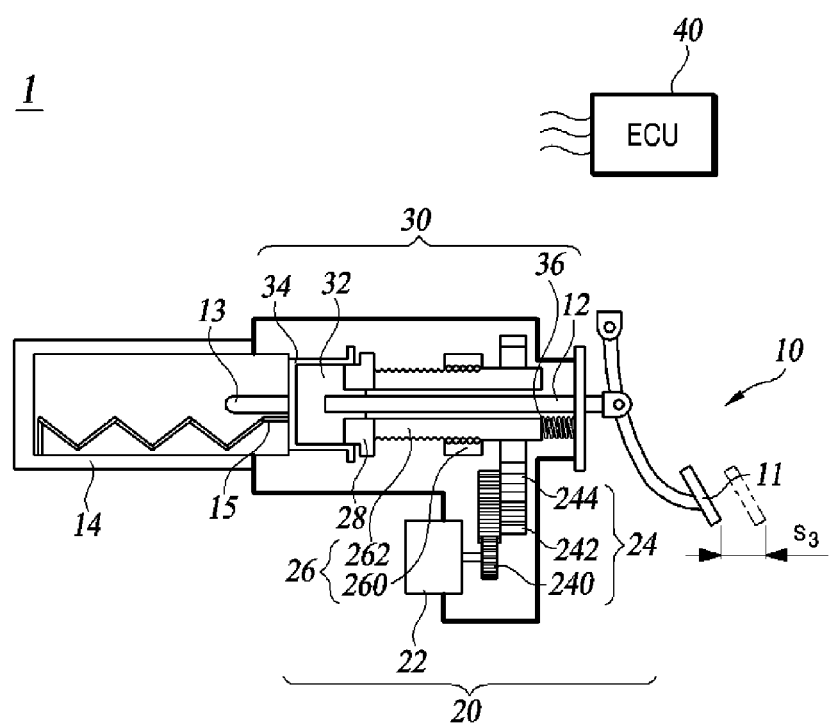
FIG. 3B is a conceptual diagram illustrating another state of the brake system in the first regenerative braking mode, according to at least one embodiment.

FIGS. 3A and 3B are conceptual diagrams illustrating states of the brake system in the first regenerative braking mode, according to at least one embodiment.

Specifically, FIG. 3A illustrates that pedal stroke $s=s_2$, and FIG. 3B stroke $s=s_3$. When the stroke that $s=s_2$ is detected by the pedal travel sensor, the electric control unit 40 controls a regenerative braking unit (not shown) to perform the regenerative braking. When $s_2<s \leq s_3$, as s increases, the motor piston 28 advances, and the reaction disk 32 is pressed more than the previous state. As the force increasingly presses the reaction disk 32, pedal feel force $F_{RD}$ increases as a reaction force thereto. For convenience, assuming pedal feel force $F_{RD}$ increases linearly, the increase rate of pedal feel force $F_{RD}$ is referred to as the first rate.

The electric control unit 40 controls the electric booster unit 20 so that the advance distance of the motor piston 28 is smaller than the amount of change in stroke s detected by the pedal travel sensor. Accordingly, the distance between the pedal 11 and the second shaft 262 decreases, and the length of the pedal spring 36 decreases. Accordingly, the compression force of the pedal spring 36 increases, and pedal feel force $F_{spring}$ increases as a reaction force thereto. While the above process is in progress, the electric control unit 40 controls the electric booster unit 20 so that the increase rate of pedal feel force $F_{spring}$ is at a second rate that is larger than the first rate.

The displacement between the motor piston 28 and the first shaft 260 shown in FIG. 3A is referred to as a first displacement $d_1$. First displacement $d_1$ is calculated by the electric control unit 40 so that an appropriate pedal feel force $(F_{pedal})$ is provided to the driver based on the detected pedal stroke (s). In this embodiment, the reference point of first displacement $d_1$ is illustrated as one end of the first shaft 260, but it is not so limited. For example, first displacement $d_1$ may be a distance measured from the setting position of the motor piston 28, that is, the set position when no depression is present on the pedal 11.

With the stroke, $s_2<s \leq s_3$, that is, in the state illustrated between FIGS. 3A and 3B, the brake system 1 brakes the vehicle with regenerative braking alone, which satisfies the relationship that total required braking force $F_{total}=F_{reg}$.

Figure 3C:
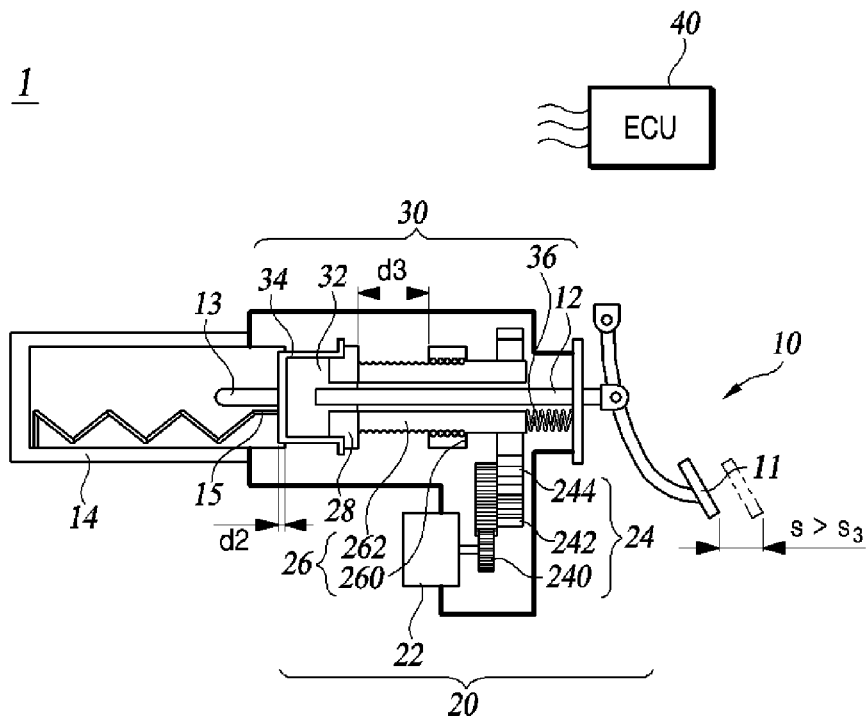
FIG. 3C is a conceptual diagram illustrating yet another state of the brake system in a second regenerative braking mode, according to at least one embodiment.

FIG. 3C is a conceptual diagram illustrating yet another state of the brake system in the second regenerative braking mode, according to at least one embodiment.

Specifically, referring also to FIG. 4, FIG. 3C illustrates the stroke, $s>s_3$, which is transitions from the state of FIG. 3B. From the time point $s=s_3$, hydraulic braking force $F_{hyd}$ is formed by the pedal master unit 10. When $s>s_3$, the motor piston 28 advances so that the internal volume of the master cylinder 14 decreases, thereby forming hydraulic braking force $F_{hyd}$. The additional displacement of the motor piston 28 at this time is referred to as a second displacement $d_2$. The value of second displacement $d_2$ is calculated by the electric control unit 40 so that appropriate total pedal feel force $F_{pedal}$ and hydraulic braking force $F_{hyd}$ are formed based on the detected pedal stroke s. A final third displacement $d_3$ between the motor piston 28 and the first shaft 260 equals the sum of displacements $d_1$ and $d_2$.

Meanwhile, as described above, the electric control unit 40 controls the electric booster unit 20 so that the advance distance of the motor piston 28 is greater than the stroke change amount of detected pedal stroke s from the pedal travel sensor. This increases the distance between the one point of the operating rod 12 and the second shaft 262 and increases the length of the pedal spring 36. Accordingly, the compression force of the pedal spring 36 decreases, and pedal feel force $F_{spring}$, which is a reaction force of the compression force of the pedal spring 36, decreases. Meanwhile, while the above-described process is in progress, the electric control unit 40 controls the electric booster unit 20 so that the increase rate of pedal feel force $F_{RD}$ is at a third rate. Here, the third rate is a value larger than the first rate.

The brake system 1 having stroke, $s>s_3$, that is, in the state shown in FIG. 3C satisfies total required braking force $F_{total}=F_{reg}+F_{hyd}$.

FIG. 4 is a graph showing a relationship between a pedal stroke and a pedal feel force for each of the sections in a regenerative braking mode of the brake system according to at least one embodiment. Referring to FIG. 4, the following describes changes in the pedal feel forces $(F_{pedal})$ and pressure of the brake system 1 in the states of FIGS. 1 to 3C as pedal stroke s increases.

The operating state of the brake system 1 when pedal stroke, $s>s_1$ corresponds to that shown in FIG. 1. As the operating rod 12 is depressed, it advances toward the reaction disk 32. At this time, as shown in FIG. 1, the end of the operating rod 12 is spaced apart from the reaction disk 32. Accordingly, the force constituting pedal feel force $F_{pedal}$ provided to the driver is consisted of pedal feel force $F_{spring}$ formed by the pedal spring 36.

The operating state of the brake system 1 when pedal stroke, $s=s_1$ corresponds to that shown in FIG. 2. As the outer circumference of the reaction disk 32 is pressed by the motor piston 28, the center of the reaction disk 32 protrudes, and the operating rod 12 advances, which causes the protruding center of the reaction disk 32 to come into contact with the end of the operating rod 12. Accordingly, pedal feel force $F_{RD}$ formed by the motor piston 28 pressing the reaction disk 32 is transmitted to the driver. This satisfies the relationship that $F_{pedal}=F_{RD}+F_{pedal}$.

When the pedal stroke, $0<s<s_2$, an invalid stroke section is established, in which none of the regenerative braking force ($F_{reg}$) and the hydraulic braking force ($F_{hyd}$) occur independently of the formation of pedal feel due to the depression on the pedal 11.

The operating state of the brake system 1 when the stroke, s=$s_2$ corresponds to that shown in FIG. 3A. From that point in time, the regenerative braking force ($F_{reg}$) is generated by the regenerative braking unit. Meanwhile, the value of total required braking force $F_{total}$ is the same as that of regenerative braking force $F_{reg}$ (not shown). When the stroke, $s_2$<s<$s_3$, the first regenerative braking mode begins.

When the stroke, $s_2$<s<$s_3$, even with the pedal 11 depressed, the motor piston 28 remains in place or advances minutely. Thus, pedal feel force $F_{RD}$ also increases equally or slightly. The rate of increase in pedal feel force $F_{RD}$ at this time is referred to as the first rate. Since the advancing distance of the pedal 11 is larger than those of the motor piston 28 and the second shaft 262, the length of the pedal spring 36 decreases and pedal feel force $F_{spring}$ increases. The rate of increase of pedal feel force $F_{spring}$ at this time is the second rate that is a value greater than the first rate.

The operating state of the brake system 1 when s=$s_3$ corresponds to that shown in FIG. 3B. From that point in time, the hydraulic braking force ($F_{hyd}$) is generated. When the stroke, s>$s_3$, the second regenerative braking mode begins.

The operating state of the brake system 1 when s>$s_3$ corresponds to that shown in FIG. 3C. The reaction disk container 34 advances, and the inside of the master cylinder 14 is pressurized. At this time, the distance between the one point of the operating rod 12 and the second shaft 262 increases, and the length of the pedal spring 36 increases. This decreases pedal feel force $F_{spring}$. To advance the reaction disk container 34, the electric booster unit 20 presses the motor piston 28 with a greater force. Accordingly, pedal feel force $F_{RD}$ increases, wherein the rate of increase of pedal feel force $F_{RD}$ is a third rate greater than the first rate.

When the stroke, s>$s_3$, the value of total required braking force $F_{total}$ is determined by the sum of regenerative braking force $F_{reg}$ and hydraulic braking force $F_{hyd}$.

Hydraulic Braking Mode

In its hydraulic braking mode according to at least one embodiment, the brake system 1 performs braking when commenced without using a regenerative braking unit provided in the vehicle. For this reason, total required braking force $F_{total}$ is satisfied by hydraulic braking force $F_{hyd}$ alone. On the other hand, when the stroke, s≤$s_2$, the operating state of the brake system 1 is the same as or equivalent to that of the brake system 1 in the regenerative braking mode, so the description thereof can be replaced with the description of FIGS. 1 and 2.

Figure 5A:
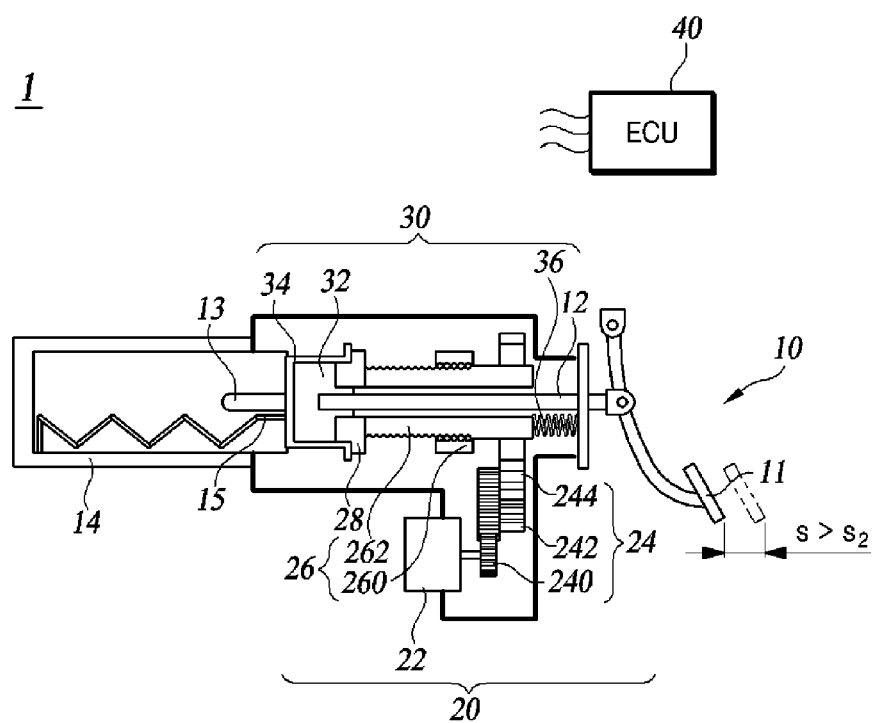
FIG. 5A is a conceptual diagram showing a state of a brake system in a hydraulic braking mode, according to at least one embodiment.

FIG. 5A is a conceptual diagram illustrating a state of a brake system in a hydraulic braking mode, according to at least one embodiment.

Specifically, FIG. 5A illustrates a state in which the stroke, $s_2$<s<$s_4$. From the point when the stroke, s=$s_2$, hydraulic braking force $F_{hyd}$ is formed by the pedal master unit 10. When s>$s_2$, the internal volume of the master cylinder 14 needs to decrease to form hydraulic braking force $F_{hyd}$. To this end, the electric booster unit 20 is driven, and the motor piston 28 advances. At this time, the force of pressing the motor piston 28 to press the reaction disk 32 and compress the return spring 15 is preferably greater than that under the same stroke in the regenerative braking mode. Therefore, the increase rate of pedal feel force $F_{RD}$ in the section where $s_2$<s<$s_4$ is a fourth rate greater than the first rate. Since the advance distance of the pedal 11 is exceeded by those of the motor piston 28 and the second shaft 262, the length of the pedal spring 36 increases and pedal feel force $F_{spring}$ decreases.

Figure 5B:
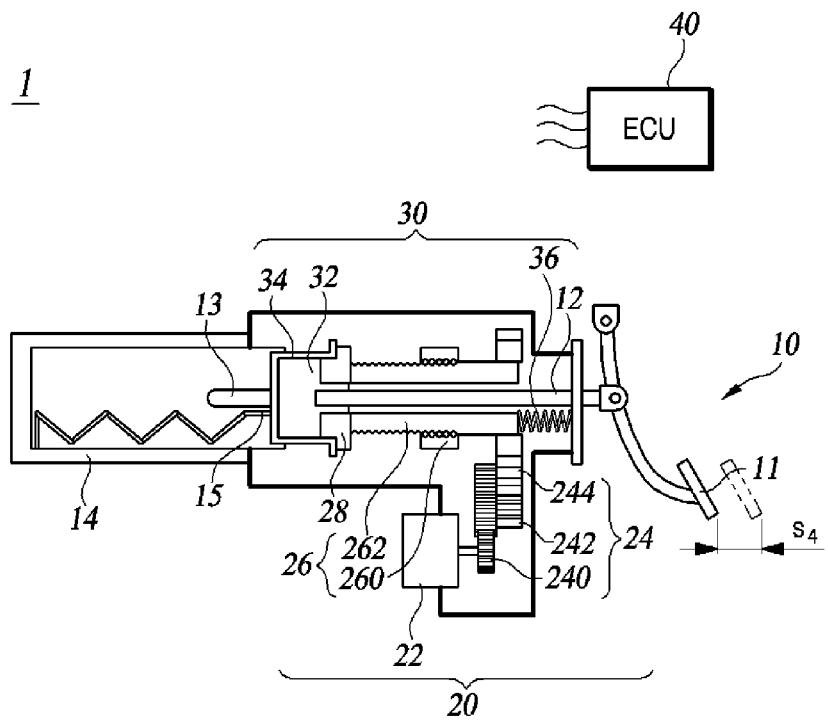
FIG. 5B is a conceptual diagram showing another state of the brake system in the hydraulic braking mode, according to at least one embodiment.

FIG. 5B is a conceptual diagram showing another state of the brake system in the hydraulic braking mode, according to at least one embodiment.

Specifically, FIG. 5B illustrates that pedal stroke s=$s_4$. When the stroke s≥$s_4$, the magnitude of the force by which the second shaft 262 presses the motor piston 28 increases to form a braking force corresponding to pedal stroke s. At this time, the increase rate of pedal feel force $F_{RD}$ is greater than the fourth rate.

Figure 6:
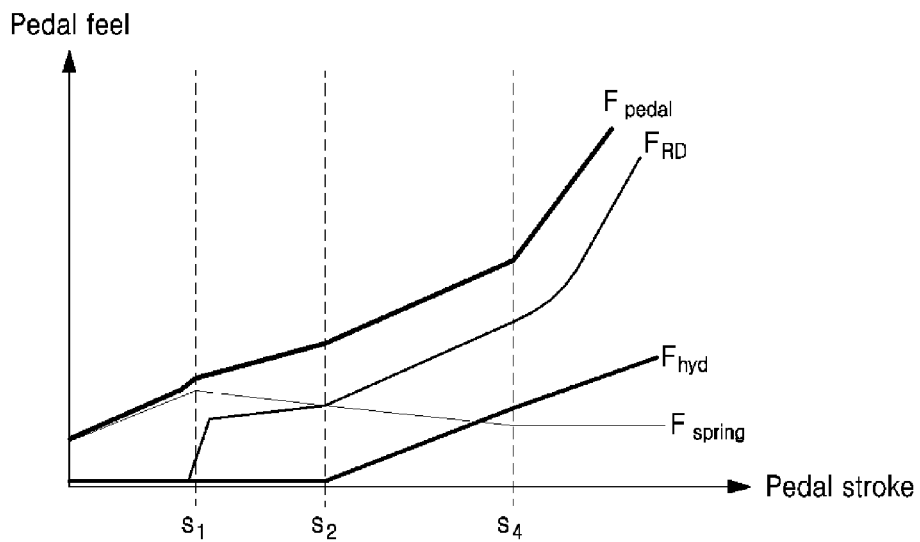
FIG. 6 is a graph showing a relationship between a pedal stroke and a pedal feel force for each of the sections in a hydraulic braking mode of a brake system according to at least one embodiment.

FIG. 6 is a graph showing a relationship between a pedal stroke and a pedal feel for each of the sections in a hydraulic braking mode of a brake system according to at least one embodiment.

When pedal strokes s≤$s_2$, the values of pedal feel forces $F_{RD}$ and $F_{spring}$ in the hydraulic braking mode may be slightly different from those of $F_{RD}$ and $F_{spring}$ in the regenerative braking mode. At this time, when pedal stroke s≤$s_2$, the operation of the brake system 1 in the hydraulic braking mode is the same as or equivalent to the operation of the brake system 1 in the regenerative braking mode, so the description thereof in that section can be replaced with that in the section that is s≤$s_2$ in FIG. 4.

When the stroke $s_2$<s<$s_4$, the operating state of the brake system 1 corresponds to that shown in FIG. 5A. In this section, the second shaft 262 and the motor piston 28 are pressed by the electric booster unit 20. At this time, pedal feel force $F_{RD}$ increases to the fourth rate greater than the first rate. When the advance distance of the operating rod 12 is exceeded by those of the second shaft 262 and the motor piston 28, the length of the pedal spring 36 increases and pedal feel force $F_{spring}$ decreases.

The operating state of the brake system 1 when stroke s≥$s_4$ corresponds to that shown in FIG. 5B. In this section, a braking force corresponding to pedal stroke s needs to be provided to the vehicle. To this end, the second shaft 262 and the motor piston 28 needs to be pressed with a force greater than that on the second shaft 262 and the motor piston 28 in the immediately preceding section. Thus, pedal feel force $F_{RD}$ increases at a rate greater than the fourth rate.

In the hydraulic braking mode, since the total required braking force ($F_{total}$) is satisfied with the hydraulic braking force ($F_{hyd}$) alone, and the relationship that $F_{total}=F_{hyd}$ is satisfied when stroke s>$s_2$.

Control Method of Brake System

Figure 7:
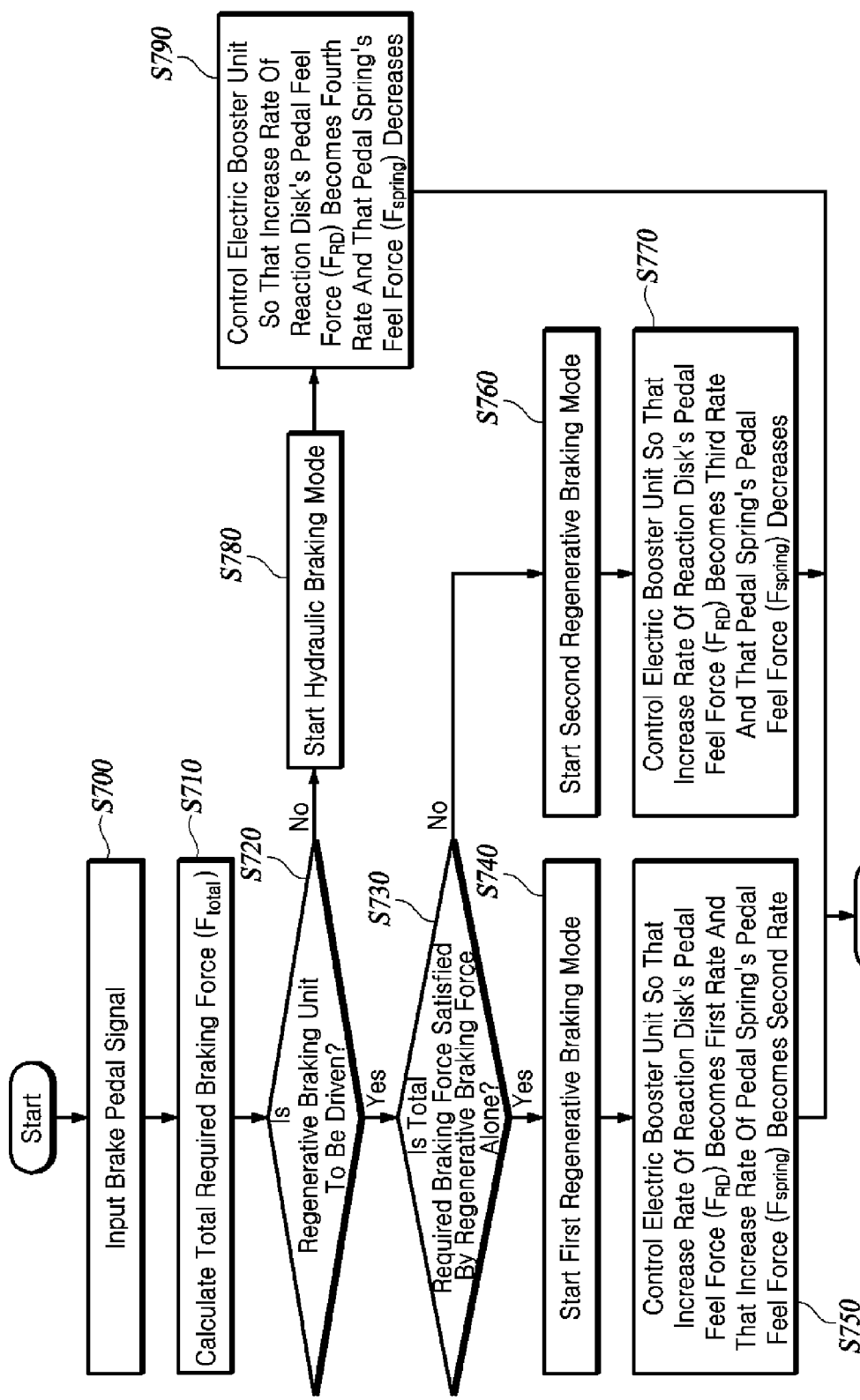
FIG. 7 is a flowchart of a method of controlling a brake system for pedal feel force formation, according to at least one embodiment.
Figure 8:
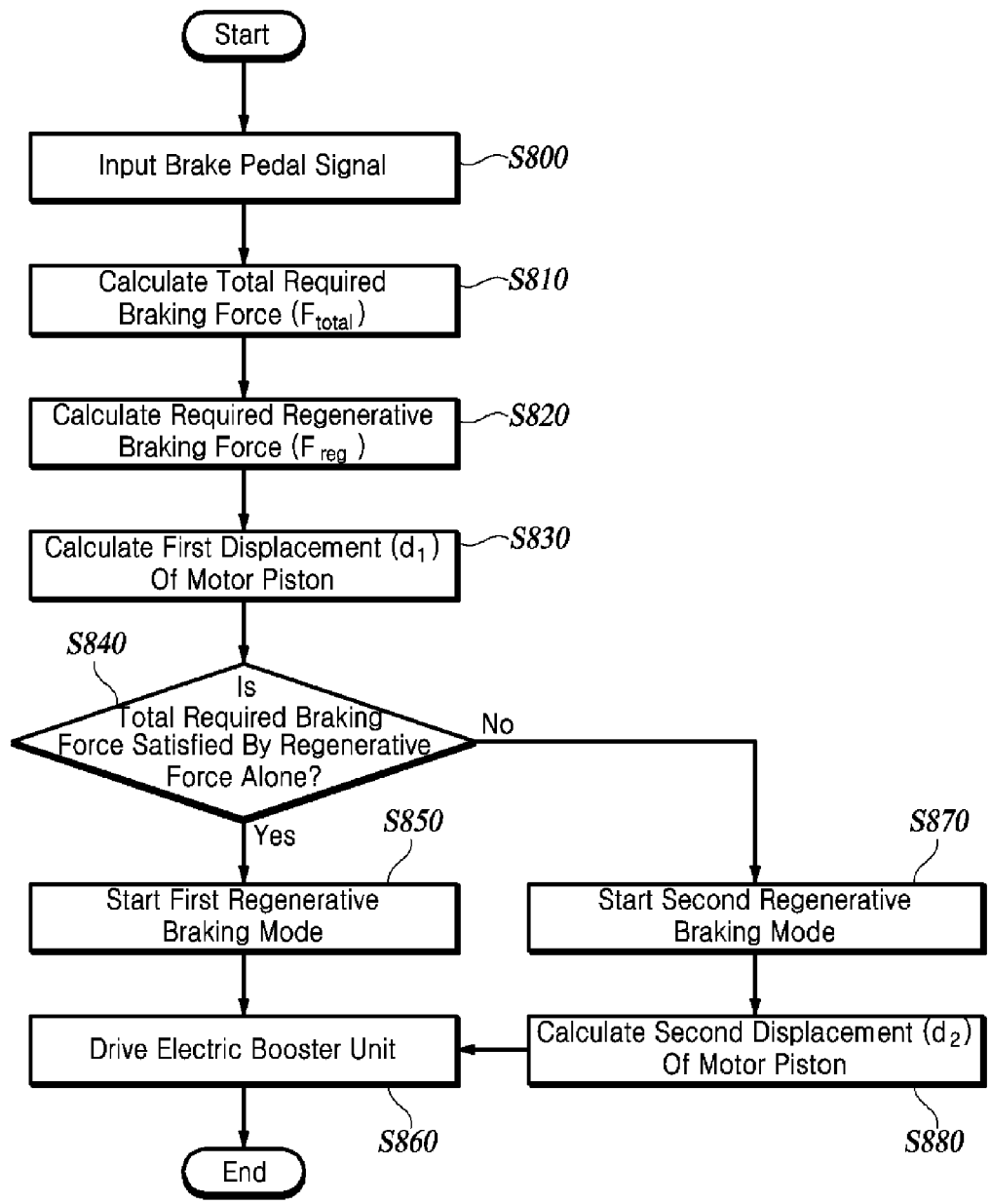
FIG. 8 is a flowchart of a method of controlling a brake system in a regenerative braking mode, according to at least one embodiment.
Figure 9:
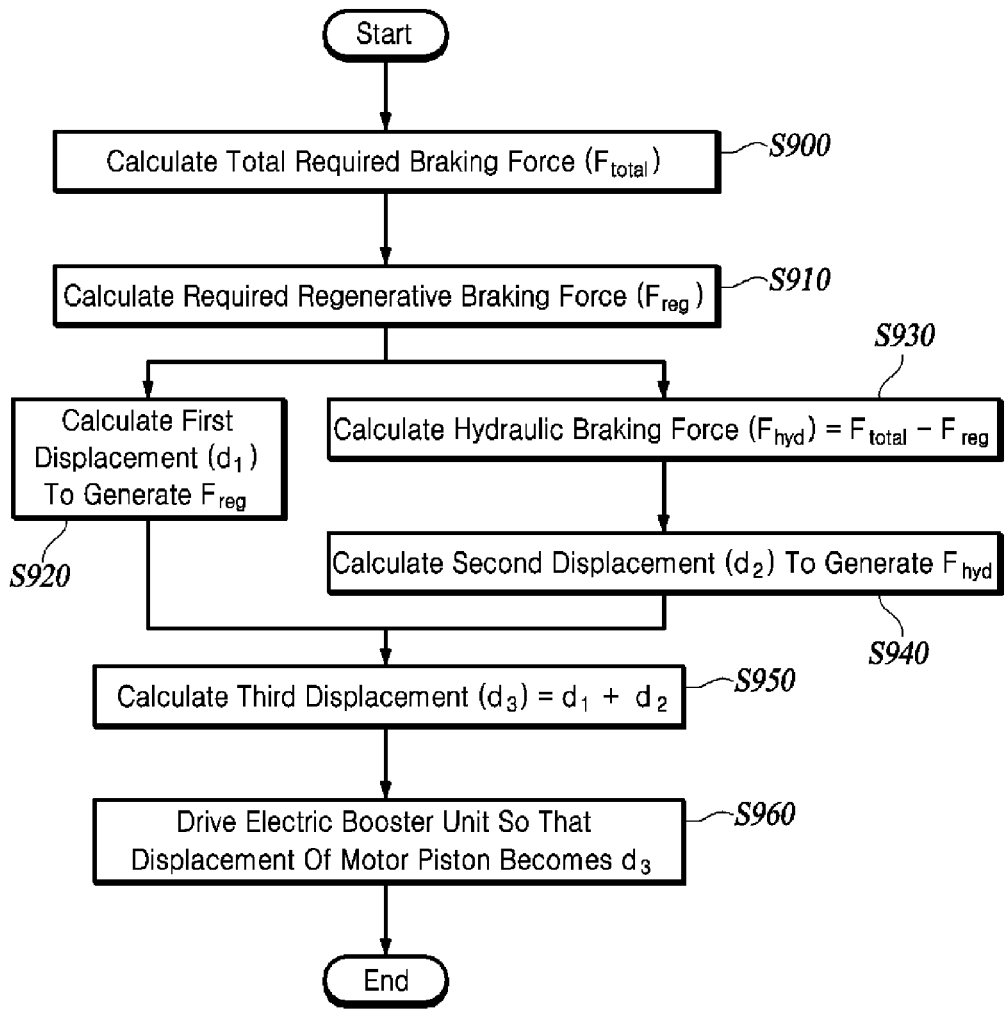
FIG. 9 is a flowchart of a method of controlling a brake system in a second regenerative braking mode, according to at least one embodiment.

It is noted that, although respective steps illustrated in FIGS. 7 to 9 are described to be performed in time-sequential orders, partially or entirely, they may be performed simultaneously in any order.

FIG. 7 is a flowchart of a method of controlling a brake system for pedal feel formation, according to at least one embodiment.

As shown in FIG. 7, when the driver depresses the pedal 11, a brake pedal signal is inputted to the electric control unit 40 (S700).

Upon receiving the brake pedal signal input, the electric control unit 40 calculates the total required braking force ($F_{total}$) based on the stroke value detected by the pedal travel sensor (PTS) (S710).

Then, the electric control unit 40 determines whether to brake the vehicle in the regenerative braking mode (S720). At this time, the braking force formed by the regenerative braking unit is defined as the regenerative braking force ($F_{reg}$).

When braking the vehicle in the regenerative braking mode, the electric control unit 40 determines whether the total required braking force ($F_{total}$) is satisfied by the regenerative braking force ($F_{reg}$) alone (S730).

When it is determined that the total required braking force $F_{total}$ is satisfied by regenerative braking force $F_{reg}$ alone, the electric control unit 40 brakes the vehicle by starting the first regenerative braking mode (S740).

When the first regenerative braking mode is started, the electric control unit 40 controls the electric booster unit 20 so that the increase rate of the pedal feel force ($F_{RD}$) formed by the reaction disk 32 becomes a first rate and that the pedal feel force ($F_{spring}$) formed by the pedal spring 36 becomes a second rate greater than the first rate (S750).

On the other hand, upon determining that the total required braking force $F_{total}$ is not satisfied with regenerative braking force $F_{reg}$ alone, the electric control unit 40 brakes the vehicle by starting the second regenerative braking mode (S760).

When the second regenerative braking mode is started, the electric control unit 40 controls the electric booster unit 20 so that the increase rate of the pedal feel force ($F_{RD}$) formed by the reaction disk 32 becomes a third rate greater than the first rate and that the pedal feel force ($F_{spring}$) formed by the pedal spring 36 decreases (S770).

On the other hand, when Step S720 of determining whether to brake the vehicle in the regenerative braking mode determines not to drive the regenerative braking unit, the electric control unit 40 starts the hydraulic braking mode (S780). At this time, hydraulic braking force $F_{hyd}$ is a force applied to the wheel brake mechanisms by interlocking with the boosting/dropping braking pressure of the brake fluid filled in the master cylinder 14. On the other hand, as the force increases, as applied by the operating rod 12 and the main piston 13 to the inside of the master cylinder 14, the hydraulic braking force $F_{hyd}$ proportionally increases.

When the hydraulic braking mode is started, the electric control unit 40 controls the electric booster unit 20 so that the increase rate of the pedal feel force ($F_{RD}$) formed by the reaction disk 32 becomes a fourth rate greater than the first rate and that the pedal feel force ($F_{spring}$) formed by the pedal spring 36 decreases (S790).

FIG. 8 is a flowchart of a method of controlling a brake system in a regenerative braking mode, according to at least one embodiment. Referring to FIG. 8, the following describes a detailed control method of the electric booster unit 20 in the regenerative braking mode. Since the contents related to Steps S800 to S810 of FIG. 8 are the same as those of Steps S700 to S710 of FIG. 7, a detailed description thereof will be omitted for sake of brevity.

In the regenerative braking mode, the electric control unit 40 calculates the required regenerative braking force ($F_{reg}$) (S820).

At this time, the electric control unit 40 calculates the first displacement ($d_1$) of the motor piston 28 to provide the driver with an appropriate pedal feel force ($F_{pedal}$) based on the detected pedal stroke (s) (S830). In this embodiment, the reference point of first displacement $d_1$ is illustrated as one end of the first shaft 260 (see FIG. 3A), but it is not so limited. For example, first displacement $d_1$ may be a distance measured from the setting position of the motor piston 28, that is, the set position when no depression is present on the pedal 11.

The electric control unit 40 determines whether total required braking force $F_{total}$ is satisfied by regenerative braking force $F_{reg}$ alone (S840).

Upon determining that total required braking force $F_{total}$ is satisfied by regenerative braking force $F_{reg}$ alone, the electric control unit 40 brakes the vehicle by starting the first regenerative braking mode (S850).

On the other hand, upon determining that the total required braking force $F_{total}$ is not satisfied by regenerative braking force $F_{reg}$ alone, the electric control unit 40 brakes the vehicle by starting a second regenerative braking mode (S870).

When the second regenerative braking mode is started, the electric control unit 40 calculates second displacement $d_2$ of the motor piston 28 so that an appropriate hydraulic braking force $F_{hyd}$ is formed based on the detected pedal stroke s. (S880).

The electric control unit 40 controls, in the first regenerative braking mode, the electric booster unit 20 to cause the motor piston 28 to have a displacement that equals to first displacement $d_1$ and controls, in the second regenerative braking mode, the electric booster unit 20 based on the values of first displacement $d_1$ and second displacement $d_2$ (S860).

FIG. 9 is a flowchart of a method of controlling a brake system in a second regenerative braking mode, according to at least one embodiment. Referring to FIG. 9, the following describes a detailed control method of the electric booster unit 20 in the second regenerative braking mode. Since the contents related to Steps S900 to S910 of FIG. 9 are the same as those of Steps S810 to S820 of FIG. 8, a detailed description thereof will be omitted for sake of brevity.

The electric control unit 40 is responsive to regenerative braking force $F_{reg}$ formed by the regenerative braking unit for calculating a first displacement $d_1$ of the motor piston configured to provide the driver with an appropriate pedal feel force $F_{pedal}$ corresponding to regenerative braking force $F_{reg}$ (S920).

Additionally, the electric control unit 40 calculates the hydraulic braking force ($F_{hyd}$) (S930). At this time, the relationship that $F_{hyd}=F_{total}-F_{reg}$ is satisfied.

To generate the calculated $F_{hyd}$, the electric control unit 40 calculates second displacement $d_2$ of the motor piston 28 (S940). At this time, second displacement $d_2$ means a distance for the motor piston 28 to be inserted while being pressed into the master cylinder 14 (see FIG. 3C).

The electric control unit 40 calculates third displacement $d_3$ of the motor piston 28 (S950). At this time, the relationship that $d_3=d_1+d_2$ is satisfied.

The electric control unit 40 drives the electric booster unit 20 so that the displacement of the motor piston 28 becomes $d_3$ (S960).

As described above, according to some embodiments described herein, when regenerative braking is performed, the hydraulic pressure is adjusted by the electric booster to correspond to the braking compensation amount by the regenerative braking. This obviates the need for a special-purpose ESC and allows the general specification electronic stability control (ESC) to be utilized for the vehicle, thereby effecting a reduced manufacturing cost of the vehicle.

Further, when the regenerative braking is performed, the hydraulic pressure is adjusted by the electric booster to correspond to the amount of braking compensation according to the regenerative braking. This prevents a pressure reduction from occurring due to ESC. Therefore, the electric booster does not need to further boost the pedal effort. As a result, a greater regenerative braking force can be generated over a conventional vehicle, thereby providing vehicles with increased fuel efficiency during driving.

Although exemplary embodiments have been described for illustrative purposes, those skilled in the art will appreciate that various modifications, additions, and substitutions are possible, without departing from the idea and scope of the claimed invention. Therefore, exemplary embodiments have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A brake system, comprising:
    a pedal master unit comprising:
    a master cylinder, and
    an operating rod configured to transmit, to the master cylinder, a pedal effort generated by a depression on a pedal;
    an electric booster unit comprising:
    a motor,
    a motor piston configured to depress the master cylinder, and
    a gear device-screw shaft combination configured to convert a rotational motion of the motor into a linear motion of the motor piston;
    a pedal-feel generating unit comprising:
    a reaction disk configured to form a first pedal feel force ($F_{RD}$) when depressed by one or more of the operating rod and the motor piston, and
    a pedal spring having one end connected to the operating rod and another end supported by the electric booster unit and arranged to form a second pedal feel force ($F_{spring}$) that is dependent on a distance between the operating rod and the electric booster unit; and
    an electric control unit configured to variably control, in a regenerative braking mode and in a hydraulic braking mode, a rate of increase of the first pedal feel force ($F_{RD}$) formed by the reaction disk for a pedal stroke to the pedal, and a rate of increase of the second pedal feel force ($F_{spring}$) formed by the pedal spring for a pedal stroke on the pedal.

2. The brake system of claim 1, wherein the regenerative braking mode comprises:
    a first regenerative braking mode in which a total required braking force ($F_{total}$) is satisfied only with a regenerative braking force ($F_{reg}$) that is formed by a regenerative braking unit provided in a vehicle; and
    a second regenerative braking mode in which the total required braking force ($F_{total}$) is satisfied by using both the regenerative braking force ($F_{reg}$) and a hydraulic braking force ($F_{hyd}$).

3. The brake system of claim 2, wherein the electric control unit when in the first regenerative braking mode is configured to be responsive to the pedal stroke increasing for controlling the electric booster unit to increase the first pedal feel force ($F_{RD}$) at a first rate and to increase the second pedal feel force ($F_{spring}$) at a second rate greater than the first rate.

4. The brake system of claim 3, wherein the electric control unit when in the second regenerative braking mode is configured to be responsive to the pedal stroke increasing for controlling the electric booster unit to increase the first pedal feel force ($F_{RD}$) at a third rate greater than the first rate and to decrease the second pedal feel force ($F_{spring}$).

5. The brake system of claim 3, wherein the electric control unit when in the hydraulic braking mode is configured to be responsive to the pedal stroke increasing for controlling the electric booster unit to increase the first pedal feel force ($F_{RD}$) at a fourth rate greater than the first rate and to decrease the second pedal feel force ($F_{spring}$).

6. A brake system, comprising:
    a pedal master unit comprising:
    a master cylinder, and
    an operating rod configured to transmit, to the master cylinder, a pedal effort generated by a depression on a pedal;
    an electric booster unit comprising:
    a motor,
    a motor piston configured to depress the master cylinder, and
    a gear device-screw shaft combination configured to convert a rotational motion of the motor into a linear motion of the motor piston;
    a pedal-feel generating unit comprising:
    a reaction disk configured to form a first pedal feel force ($F_{RD}$) when depressed by one or more of the operating rod and the motor piston, and
    a pedal spring having one end connected to the operating rod and another end supported by the electric booster unit and arranged to form a second pedal feel force ($F_{spring}$) that is dependent on a distance between the operating rod and the electric booster unit; and
    an electric control unit configured to calculate a total required braking force ($F_{total}$) and a required regenerative braking force ($F_{reg}$) of a vehicle and to variably control a displacement (d) of the motor piston for a stroke on the pedal in a regenerative braking mode and according to whether or not a hydraulic braking force ($F_{hyd}$) is generated by the master cylinder.

7. The brake system of claim 6, wherein the regenerative braking mode comprises:
    a first regenerative braking mode in which the total required braking force ($F_{total}$) is satisfied only with the regenerative braking force ($F_{reg}$) that is formed by a regenerative braking unit provided in the vehicle; and
    a second regenerative braking mode in which the total required braking force ($F_{total}$) is satisfied by using the regenerative braking force ($F_{reg}$) and a hydraulic braking force ($F_{hyd}$).

8. The brake system of claim 7, wherein the electric control unit when in the first regenerative braking mode is configured to be operative, based on the regenerative braking force ($F_{reg}$), to calculate a first displacement ($d_1$) of the motor piston to provide a driver with a pedal feel and to control the electric booster unit for causing the motor piston to move by the first displacement ($d_1$).

9. The brake system of claim 8, wherein the electric control unit when in the second regenerative braking mode is configured to calculate the hydraulic braking force ($F_{hyd}$) and calculate, based on the hydraulic braking force ($F_{hyd}$), a second displacement ($d_2$) of the motor piston for generating a pedal feel to the driver.

10. The brake system of claim 9, wherein the electric control unit is configured to calculate a third displacement ($d_3$) by summing the first displacement ($d_1$) and the second displacement ($d_2$) and to control the electric booster unit for causing the motor piston to move by the third displacement ($d_3$).

11. The brake system of claim 9, wherein the hydraulic braking force ($F_{hyd}$), the total required braking force ($F_{total}$), and the regenerative braking force ($F_{reg}$) satisfy the following equation:

$$F_{hyd} = F_{total} - F_{reg}.$$

12. A method of controlling a brake system, the method comprising:
  calculating, in response to a depression on a braking pedal of a vehicle as measured by a pedal travel sensor, a total required braking force for braking the vehicle based on a stroke to the braking pedal;
  determining whether to drive a regenerative braking unit provided in the vehicle;
  calculating, when the regenerative braking unit is driven, a regenerative braking force required for performing regenerative braking of the vehicle based on the total required braking force;
  determining whether the total required braking force is provided by the regenerative braking force alone when the regenerative braking unit is driven;
  starting a first regenerative braking mode upon determining that the total required braking force is provided by the regenerative braking force alone; and
  when starting the first regenerative braking mode, controlling an electric booster unit to cause an increase rate of a first pedal feel force ($F_{RD}$) of a reaction disk to be a first rate and to cause an increase rate of a second pedal feel force ($F_{spring}$) of a pedal spring to be a second rate greater than the first rate.

13. The method of claim 12, further comprising:
  starting a second regenerative braking mode upon determining that the total required braking force is not provided by the regenerative braking force alone; and
  when starting the second regenerative braking mode, controlling the electric booster unit to cause the increase rate of the first pedal feel force ($F_{RD}$) to be a third rate greater than the first rate and to decrease the second pedal feel force ($F_{spring}$).

14. The method of claim 12, further comprising:
  starting a hydraulic braking mode when the regenerative braking unit is not driven; and
  when starting the hydraulic braking mode, controlling the electric booster unit to cause the increase rate of the first pedal feel force ($F_{RD}$) be a fourth rate greater than the first rate and to decrease the second pedal feel force ($F_{spring}$).

15. A method of controlling a brake system, the method comprising:
  calculating, in response to a depression on a braking pedal of a vehicle as measured by a pedal travel sensor, a total required braking force ($F_{total}$) for braking the vehicle based on a stroke to the braking pedal;
  calculating, when a regenerative braking unit provided in the vehicle is driven, a regenerative braking force ($F_{reg}$) required for performing regenerative braking of the vehicle based on the total required braking force ($F_{total}$);
  calculating, based on the regenerative braking force ($F_{reg}$), a first displacement ($d_1$) of a motor piston configured to depress a reaction disk to provide a driver with a pedal feel;
  determining whether the total required braking force ($F_{total}$) is provided by the regenerative braking force ($F_{reg}$) alone when the regenerative braking unit is driven;
  starting a first regenerative braking mode upon determining that the total required braking force ($F_{total}$) is provided by the regenerative braking force ($F_{reg}$) alone; and
  controlling an electric booster unit provided in the vehicle to cause the motor piston to have a displacement that is equal to the first displacement ($d_1$).

16. The method of claim 15, further comprising:
  starting a second regenerative braking mode upon determining that the total required braking force ($F_{total}$) is not provided by the regenerative braking force ($F_{reg}$) alone;
  calculating a second displacement ($d_2$) of the motor piston configured to internally depress a master cylinder provided in the vehicle; and
  calculating a third displacement ($d_3$) by summing the first displacement ($d_1$) and the second displacement ($d_2$) and controlling the electric booster unit for causing the motor piston to move by the third displacement ($d_3$).

17. The method of claim 16, further comprising:
  when starting the second regenerative braking mode, calculating a hydraulic braking force ($F_{hyd}$) generated by the master cylinder; and
  calculating the second displacement ($d_2$) based on the hydraulic braking force ($F_{hyd}$).

18. The method of claim 17, wherein the hydraulic braking force ($F_{hyd}$), the total required braking force ($F_{total}$), and the regenerative braking force ($F_{reg}$) satisfy the following equation:

$$F_{hyd} = F_{total} - F_{reg}.$$

19. The method of claim 16, comprising:
  forming a first pedal feel force ($F_{RD}$) with a reaction disk when depressed by one or more of an operating rod of the master cylinder and the motor piston; and
  forming a second pedal feel force ($F_{spring}$) with a pedal spring having one end connected to the operating rod and another end supported by the electric booster unit that is dependent on a distance between the operating rod and the electric booster unit,
  wherein, when in the first regenerative braking mode, the method is configured to be responsive to the pedal stroke increasing for controlling the electric booster unit to increase the first pedal feel force ($F_{RD}$) at a first rate and to increase the second pedal feel force ($F_{spring}$) at a second rate greater than the first rate.

20. The method of claim 19, wherein, when in the second regenerative braking mode, the method is configured to be responsive to the pedal stroke increasing for controlling the electric booster unit to increase the first pedal feel force ($F_{RD}$) at a third rate greater than the first rate and to decrease the second pedal feel force ($F_{spring}$).

* * * * *